US011886031B2

(12) United States Patent
Grejda et al.

(10) Patent No.: US 11,886,031 B2
(45) Date of Patent: Jan. 30, 2024

(54) OPTICAL ASSEMBLIES AND APPARATUSES AND METHODS FOR ALIGNING COMPONENTS OF OPTICAL ASSEMBLIES

(71) Applicant: CORNING INCORPORATED, Corning, NY (US)

(72) Inventors: Robert Dennis Grejda, Fairport, NY (US); Kevin John Magierski, Victor, NY (US); Brian Monroe McMaster, Pittsford, NY (US); Todd Robert McMichael, Rochester, NY (US)

(73) Assignee: Corning Incorporated, Corning, NY (US)

( * ) Notice: Subject to any disclaimer, the term of this patent is extended or adjusted under 35 U.S.C. 154(b) by 465 days.

(21) Appl. No.: 16/941,999

(22) Filed: Jul. 29, 2020

(65) Prior Publication Data
US 2021/0055498 A1    Feb. 25, 2021

Related U.S. Application Data

(60) Provisional application No. 62/902,667, filed on Sep. 19, 2019, provisional application No. 62/891,055, filed on Aug. 23, 2019.

(51) Int. Cl.
*G02B 7/00* (2021.01)
*G02B 7/02* (2021.01)

(52) U.S. Cl.
CPC .......... *G02B 7/003* (2013.01); *G02B 7/021* (2013.01)

(58) Field of Classification Search
CPC .. A23L 27/32; C07K 5/0613; G01M 11/0214; G01M 11/0221; G02B 27/62; G02B 7/003; G02B 7/021; B24B 13/005
See application file for complete search history.

(56) References Cited

U.S. PATENT DOCUMENTS

| | | | |
|---|---|---|---|
| 2,817,533 A | 12/1957 | Herbst | |
| 7,508,606 B2 * | 3/2009 | Neely | G02B 27/62 |
| | | | 359/821 |
| 10,895,711 B2 * | 1/2021 | McMaster | G02B 7/025 |

FOREIGN PATENT DOCUMENTS

| | | | | |
|---|---|---|---|---|
| AT | 005793 U1 | 11/2002 | | |
| EP | 736788 A2 * | 10/1996 | | G02B 7/023 |

OTHER PUBLICATIONS

Youtube video https://www.youtube.com/watch?v=YO2AYz9EHk4 Published on Oct. 13, 2015, (Year: 2015).*

(Continued)

*Primary Examiner* — Joseph P Martinez
*Assistant Examiner* — Vipin Patel
(74) *Attorney, Agent, or Firm* — Amy T. Lang

(57) ABSTRACT

An alignment apparatus for aligning components of an optical assembly include a chuck configured to support the optical assembly thereon, and an adjustable flexure assembly disposed around the chuck. The adjustable flexure assembly includes a plurality of flexures. The plurality of flexures are positioned relative to the chuck such that each of the plurality of flexures contact the optical assembly when the optical assembly is positioned on the chuck. Adjustment of a position of one or more flexures of the plurality of flexures adjusts an alignment of an optical axis of an optical component of the optical assembly when the optical assembly is positioned on the chuck, wherein the alignment apparatus is configured to align optical axes of the optical component to an angle of deviation of less than about 1,000 µrad and provide an extinction ratio within the optical assembly of greater than or equal to 1000:1.

20 Claims, 8 Drawing Sheets

(56) References Cited

OTHER PUBLICATIONS

Trioptics, "MultiCentric Dementing Station", Available Online at <https://www.trioptics.com/fileadmin/assets/trioptics/04_Downloads/OptiCentric/MultiCentric-Cementing-Station.pdf>, 2015, 5 pages.
International Search Report and Written Opinion of the International Searching Authority; PCT/US2020/045110; dated Dec. 9, 2020; 19 pages; European Patent Office.
Wilde et al., "Novel process for production of micro lenses with increased centering accuracy and imaging performance", Proceedings of the SPIE, vol. 10448, Oct. 2017.

\* cited by examiner

OPTICAL ASSEMBLIES AND APPARATUSES AND METHODS FOR ALIGNING COMPONENTS OF OPTICAL ASSEMBLIES

This Application claims priority under 35 USC § 119(e) from U.S. Provisional Patent Application Ser. No. 62/891,055, filed on Aug. 23, 2019 and from U.S. Provisional Patent Application Ser. No. 62/902,667, filed on Sep. 19, 2019, the content of which is relied upon and incorporated herein by reference in its entirety.

TECHNICAL FIELD

The present specification generally relates to optical assemblies and apparatuses and methods for aligning components of optical assemblies and, more specifically, to apparatuses and methods for aligning optical axes of lenses of optical assemblies.

BACKGROUND

Optical assemblies, such as "doublets" or "triplets," may include two or more lenses that are adhered together with an optical adhesive between adjacent optical surfaces. Such apparatuses may be used in ultraviolet and visible wavelength imaging objectives in a range of applications such as, for example and without limitation, semiconductor inspection, microscope imaging, visible light cameras, and the like.

During manufacture of the optical assemblies, it is desired to properly align the optical axes of the individual lenses, which may prove difficult depending on the desired alignment tolerances.

Accordingly, a need exists for alternative apparatuses and methods for aligning components of optical assemblies for improved optical performance.

SUMMARY

In a first aspect, an alignment apparatus for aligning components of an optical assembly include a chuck configured to support the optical assembly thereon, and an adjustable flexure assembly disposed around the chuck. The adjustable flexure assembly includes a plurality of flexures. The plurality of flexures are positioned relative to the chuck such that each of the plurality of flexures contact the optical assembly when the optical assembly is positioned on the chuck. Adjustment of a position of one or more flexures of the plurality of flexures adjusts an alignment of an optical axis of an optical component of the optical assembly when the optical assembly is positioned on the chuck, wherein the alignment apparatus is configured to align optical axes of the optical component to an angle of deviation of less than about 1,000 µrad and provide an extinction ratio within the optical assembly of greater than or equal to 1000:1.

In a second aspect according to the first aspect, wherein the adjustable flexure assembly is rotatable around a datum axis.

In a third aspect according to the second aspect, wherein the chuck is rotatable around the datum axis.

In a fourth aspect according to any preceding aspect, wherein the chuck includes a vacuum channel, and the optical assembly is supported on the chuck by vacuum pressure provided through the vacuum channel.

In a fifth aspect according to any preceding aspect, wherein the adjustable flexure assembly further includes a tip-tilt assembly disposed around the chuck. The tip-tilt assembly includes a base plate defining a support surface, an adjustable plate adjustably coupled to the base plate, the adjustable plate supporting the plurality of flexures thereon, and one or more adjustment actuators configured to adjust a position of the adjustable plate relative to the support surface of the base plate.

In a sixth aspect according to the fifth aspect, further including a column supporting the chuck thereon, wherein the adjustable flexure assembly is disposed around the column and is slidable along the column so as to be adjustably positioned along a length of the column.

In a seventh aspect according to the fifth or the sixth aspect, wherein the base plate defines a base plate aperture, the adjustable plate defines an adjustable plate aperture aligned with the base plate aperture, and the base plate aperture and the adjustable plate aperture are sized to allow passage of the chuck therethrough.

In an eighth aspect according to any of the fifth through the seventh aspects, wherein the one or more adjustment actuators are configured to adjust a tilt of the adjustable plate relative to the support surface of the base plate.

In a ninth aspect according to any of the fifth through the eighth aspects, further including a plurality of flexure clamps coupled to the adjustable plate.

In a tenth aspect according to the ninth aspect, wherein each flexure clamp is coupled to the adjustable plate. Each flexure clamp includes a fixed portion, fixedly coupled to the adjustable plate, a sliding portion, wherein a flexure of the plurality of flexures is coupled to the sliding portion, and a flexible webbing coupling the fixed portion to the sliding portion. The adjustable flexure assembly further includes a sliding actuator associated with each flexure clamp, wherein the sliding actuator is configured to contact the sliding portion of the flexure clamp to displace the sliding portion relative to the adjustable plate thereby flexing the flexible webbing and adjusting the position of the flexure coupled to the flexure clamp relative to the adjustable plate and the chuck.

In an eleventh aspect according to the tenth aspect, further including a plurality of stops coupled to the adjustable plate proximate the sliding portion of the flexure clamp, wherein each stop limits the sliding of the sliding portion of the flexure clamp.

In a twelfth aspect according to any preceding aspect, further including a centration measurement apparatus configured to measure an optical axis alignment of one or more components of the optical assembly.

In a thirteenth aspect according to any preceding aspect, wherein a force/displacement ratio applied by the plurality of flexures to the optical component is about $1.0 \times 10^{-6}$ N/mm to about $2 \times 10^{-6}$ N/mm.

In a fourteenth aspect according to any preceding aspect, wherein each flexure of the plurality of flexures comprises a length to diameter ratio of about 80:1 to about 160:1.

In a fifteenth aspect, a method for aligning components of an optical assembly includes placing a first lens comprising a first lens optical axis on a chuck of an alignment apparatus for aligning components of the optical assembly, applying a liquid to a coupling surface of the first lens, placing a second lens comprising a second lens optical axis on the coupling surface of the first lens such that the liquid is disposed between the first lens and the second lens, contacting an edge of the second lens with a plurality of flexures, and adjusting a position of one or more flexures of the plurality of flexures in contact with the second lens thereby aligning the second lens optical axis of the second lens with the first lens optical axis of the first lens.

In a sixteenth aspect according to the fifteenth aspect, further including rotating the alignment apparatus about a datum axis.

In a seventeenth aspect according to the fifteenth or the sixteenth aspect, further including measuring an optical axis alignment of the first lens and the second lens with a centration measurement apparatus, and evaporating the liquid when the optical axis alignment of the first lens and the second lens is within a predetermined alignment range.

In an eighteenth aspect according to any of the fifteenth through the seventeenth aspects, wherein the first lens comprises a convex coupling surface and the second lens comprises a concave coupling surface, wherein the concave coupling surface of the second lens is contacted to the convex coupling surface of the first lens with the liquid.

In a nineteenth aspect, an optical assembly includes a first lens and a second lens, and an optical adhesive coupling the first lens and the second lens. The first lens has a first lens optical axis and the second lens has a second lens optical axis. The first lens optical axis is aligned with the second lens optical axis such that an angle of deviation between the first lens optical axis and the second lens optical axis is less than about 1,000 μrad. A liquid is positioned between the first lens and the second lens during alignment of the first lens optical axis and the second lens optical axis so as to provide a reduced stress profile within the optical assembly, wherein an extinction ratio of the optical assembly is greater than or equal to 1000:1

In a twentieth aspect according to the nineteenth aspect, the first lens comprises a concave coupling surface, the second lens comprises a convex coupling surface, and the concave coupling surface of the first lens is bonded to the convex coupling surface of the second lens.

In a twenty-first aspect according to the nineteenth aspect or the twentieth aspect, wherein prior to the liquid comprises viscosity of less than about 500 cps.

In a twenty-second aspect according to the any of the nineteenth through the twenty-first aspects, wherein prior the liquid comprises viscosity of between about 10 cps and 500 cps.

In a twenty-third aspect according to the any of the nineteenth through the twenty-second aspects, wherein the angle of deviation between the first lens optical axis and the second lens optical axis is less than about 10 μrad.

In a twenty-fourth aspect according to the any of the nineteenth through the twenty-third aspects, wherein the angle of deviation between the first lens optical axis and the second lens optical axis is less than about 1 μrad.

In a twenty-fifth aspect according to the any of the nineteenth through the twenty-fourth aspects, wherein the first lens is molecularly bonded to the second lens.

In a twenty-sixth aspect, a method for aligning components of an optical assembly includes placing a first lens comprising a first lens optical axis an alignment apparatus for aligning components of the optical assembly. The alignment apparatus includes a chuck configured to support the optical assembly thereon, wherein the first lens is positioned on the chuck, and an adjustable flexure assembly disposed around the chuck, the adjustable flexure assembly including a plurality of flexures. The plurality of flexures are positioned relative to the chuck such that each of the plurality of flexures contact the optical assembly when the optical assembly is positioned on the chuck. Adjustment of a position of one or more flexures of the plurality of flexures adjusts an alignment of an optical axis of an optical component of the optical assembly when the optical assembly is positioned on the chuck. The method further includes applying a liquid to a coupling surface of the first lens, placing a second lens having a second lens optical axis on the coupling surface of the first lens such that the liquid is disposed between the first lens and the second lens, contacting an edge of the second lens with the plurality of flexures, adjusting the position of one or more flexures of the plurality of flexures in contact with the second lens, and aligning the second lens optical axis of the second lens with the first lens optical axis of the first lens such that an angle of deviation between the first lens optical axis and the second lens optical axis is less than about 1,000 μrad and an extinction ratio of the optical assembly is greater than or equal to 1000:1.

In a twenty-seventh aspect according to the twenty-sixth aspect, further including measuring an optical axis alignment of the first lens and the second lens with a centration measurement apparatus, and evaporating the liquid when the optical axis alignment of the first lens and the second lens is within a predetermined alignment range.

In a twenty-eighth aspect according to the twenty-sixth aspect or the twenty-seventh aspect, wherein the first lens comprises a convex coupling surface and the second lens comprises a concave coupling surface, wherein the concave coupling surface of the second lens is contacted to the convex coupling surface of the first lens with the liquid.

In a twenty-ninth aspect according to the twenty-sixth aspect or the twenty-eighth aspect, wherein the liquid is an optical adhesive.

In a thirtieth aspect according to the twenty-ninth aspect, further including curing the optical adhesive when optical axis alignment of the first lens and the second lens is within a predetermined alignment range.

In a thirty-first aspect according to any of the twenty-sixth aspect through the thirtieth aspect, wherein the adjustable flexure assembly is rotatable around a datum axis.

In a thirty-second aspect according to the thirty-first aspect, wherein the chuck is rotatable around the datum axis.

In a thirty-third aspect according to any of the twenty-sixth aspect through the thirty-second aspect, the chuck includes a vacuum channel, and the optical assembly is supported on the chuck by vacuum pressure provided through the vacuum channel.

In a thirty-fourth aspect according to any of the twenty-sixth aspect through the thirty-third aspect, wherein the adjustable flexure assembly further includes a tip-tilt assembly disposed around the chuck. The tip-tilt assembly includes a base plate defining a support surface, an adjustable plate adjustably coupled to the base plate, the adjustable plate supporting the plurality of flexures thereon, and one or more adjustment actuators configured to adjust a position of the adjustable plate relative to the support surface of the base plate.

In a thirty-fifth aspect according to the thirty-fourth aspect, the alignment apparatus further comprises a column supporting the chuck thereon, wherein the adjustable flexure assembly is disposed around the column and is slidable along the column so as to be adjustably positioned along a length of the column.

In a thirty-sixth aspect according to the thirty-fourth aspect or the thirty-fifth aspect, wherein the base plate defines a base plate aperture, the adjustable plate defines an adjustable plate aperture aligned with the base plate aperture, and the base plate aperture and the adjustable plate aperture are sized to allow passage of the chuck therethrough.

In a thirty-seventh aspect according to any of the thirty-fourth aspect through the thirty-sixth aspect, wherein the one or more adjustment actuators are configured to adjust a tilt of the adjustable plate relative to the support surface of the base plate.

In a thirty-eighth aspect according to any of the thirty-fourth aspect through the thirty-seventh aspect, wherein the adjustable flexure assembly further includes a plurality of flexure clamps coupled to the adjustable plate.

In a thirty-ninth aspect according to the thirty-eighth aspect, wherein each flexure clamp is coupled to the adjustable plate and includes a fixed portion, fixedly coupled to the adjustable plate, a sliding portion, wherein a flexure of the plurality of flexures is coupled to the sliding portion, and a flexible webbing coupling the fixed portion to the sliding portion, wherein the adjustable flexure assembly further comprises a sliding actuator associated with each flexure clamp, wherein the sliding actuator is configured to contact the sliding portion of the flexure clamp to displace the sliding portion relative to the adjustable plate thereby flexing the flexible webbing and adjusting the position of the flexure coupled to the flexure clamp relative to the adjustable plate and the chuck.

In a fortieth aspect according to the thirty-ninth aspect, wherein the adjustable flexure assembly further includes a plurality of stops coupled to the adjustable plate proximate the sliding portion of the flexure clamp, wherein each stop limits the sliding of the sliding portion of the flexure clamp.

In a forty-first aspect any of the twenty-sixth aspect through the fortieth aspect, wherein the alignment apparatus further comprises a centration measurement apparatus configured to measure an optical axis alignment of one or more components of the optical assembly.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
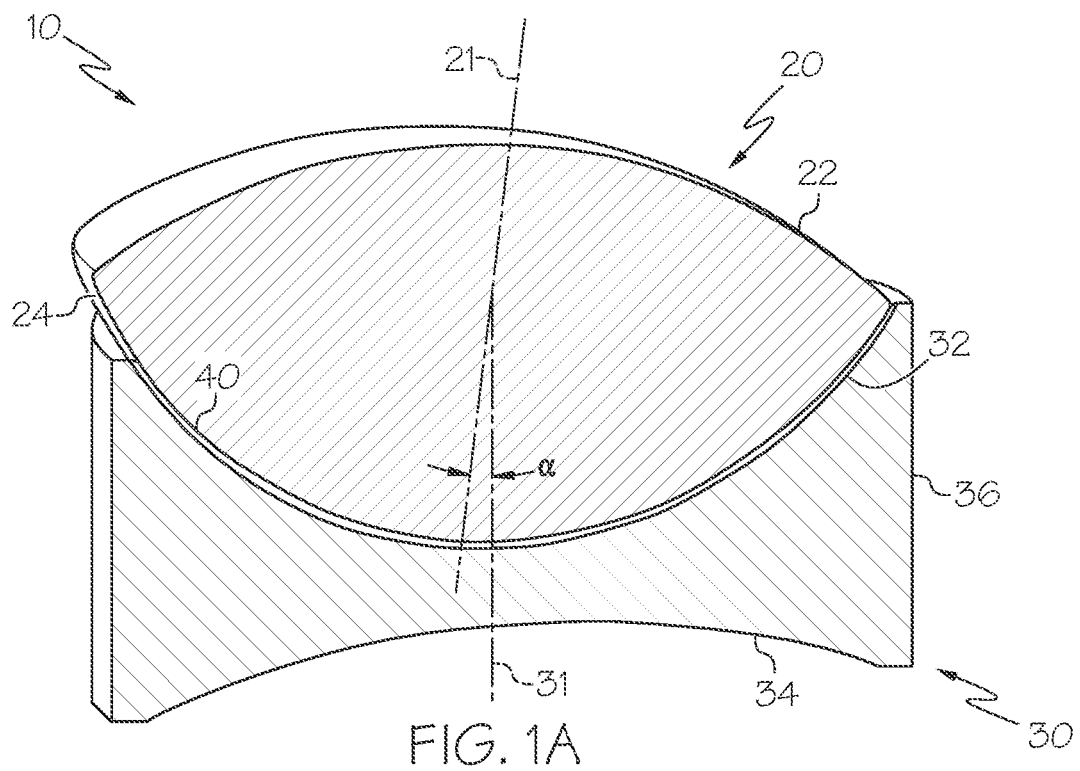
FIG. 1A depicts the pre-alignment orientation of the components of an optical assembly, according to one or more embodiments shown and described herein.

Embodiments described herein are directed to apparatuses and methods for aligning components of optical assemblies. For example, an alignment apparatus for aligning components of optical assemblies may include a chuck configured to support the optical assembly thereon, and an adjustable flexure assembly. The adjustable flexure assembly may be disposed around the chuck and include a plurality of flexures. The plurality of flexures are configured to contact the optical assembly, such as an edge of the optical assembly. Adjustment of a position of one or more flexures of the plurality of flexures causes an adjustment in an optical axis alignment of one or more components (e.g., lenses) of the optical assembly. Accordingly, alignment of the optical axes of the various components of the optical assembly may be achieved. The flexures may provide a subtle contact force to displace the components of the optical assembly into alignment. Such subtle contact force may decrease force disturbances and stress within an optical adhesive positioned between optical components, thereby improving the quality and optical properties of the optical assembly. Various embodiments of the alignment apparatus and methods of alignment, as well as optical assemblies, will be described in more detail herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom, upper, lower—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Figure 1B:
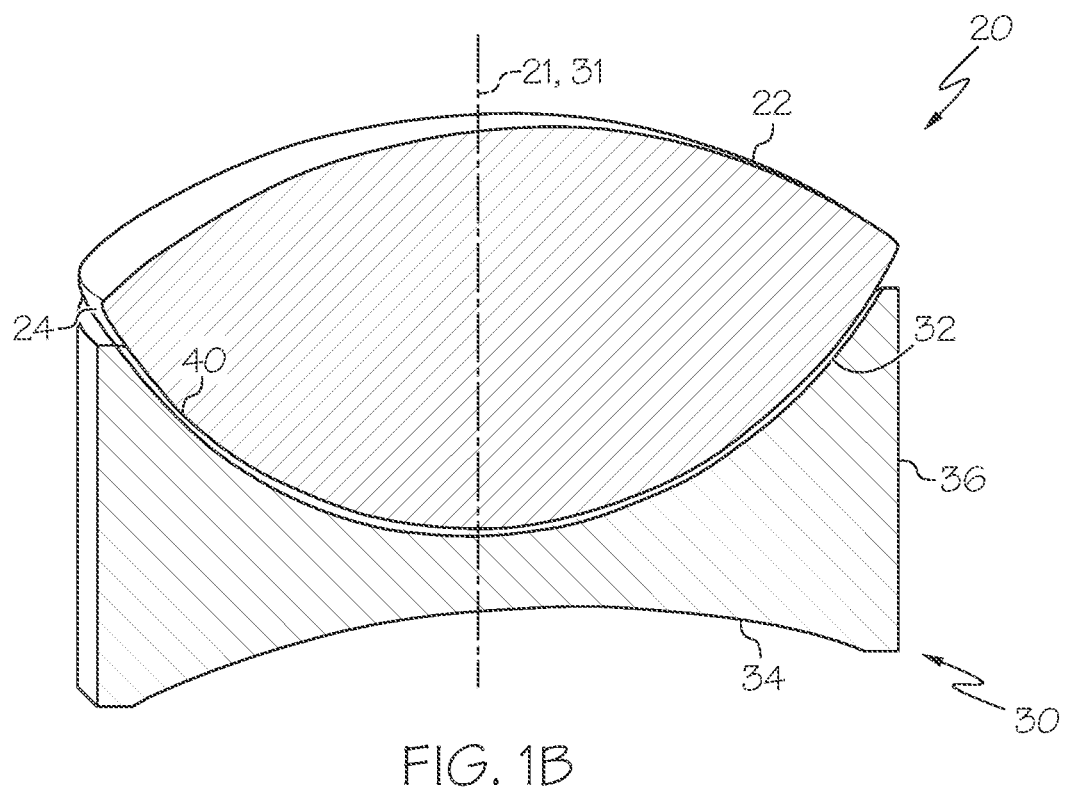
FIG. 1B depicts the optical assembly of FIG. 1A post-alignment, according to one or more embodiments shown and described herein.

Referring now to FIGS. 1A and 1B an optical assembly 10 is generally depicted. As used herein, "an optical assembly" is an arrangement of optical components (e.g., lenses, mirrors, etc.) that guide the transmission of light. The optical assembly 10 may include various components each comprising an optical axis. An optical axis, as used herein, is an imaginary line or line segment that passes through a center of curvature of a lens' surfaces. In particular, the optical assembly 10 may include a first lens 20 including a first lens optical axis 21 and a second lens 30 including a second lens optical axis 31.

During conventional manufacturing of optical assemblies (e.g., doublets, triplets, or the like), fine alignment of the first lens optical axis 21 and the second lens optical axis 31 is desired. Alignment may be a tedious and difficult process especially when working with lenses of various sizes, mating curvatures, and curvature orientations. For example, it may be difficult to stabilize the top lens relative to the bottom lens in a preferred orientation such that the optical axes 21, 31 are aligned. This may be especially true for small lenses (e.g., having a diameter of 10 mm or less) with short curvature radii.

Embodiments described herein are directed to apparatuses and methods for stabilizing the top and bottom lenses to provide a desired alignment. Additionally embodiments as provided herein may be used for alignment of micro-optic components (e.g., lenses having edge thickness of 2-3 mm or less and diameters of less than 8 mm). Furthermore, embodiments as provided herein may provide low contact forces that do not stress optical elements or the connecting adhesive layer to the same degree as conventional assembly techniques (i.e., wherein the adhesive is at least partially cured during alignment). Additionally, embodiments can provide fine adjustments for sub-micron and/or micro-radian level alignments.

Still referring to FIGS. 1A and 1B, in FIG. 1A the optical assembly 10 is not aligned. That is, the first lens optical axis 21 is not aligned with second lens optical axis 31. For example, in this unaligned state, the angle of deviation a between the first lens optical axis 21 and the second lens optical axis 31 is greater than a predetermined alignment range (e.g., greater than about 1,000 µrad, greater than about 500 µrad, greater than about 100 µrad, greater than about 10 µrad, greater than about 1 µrad, etc.) depending on the particular application or type of optical assembly.

By way of contrast, FIG. 1B depicts the first lens optical axis 21 aligned with the second lens optical axis 31. While the first lens optical axis 21 is shown as coincident with the second lens optical axis 31, the optical assembly 10 may be considered aligned when the angle of deviation a between the first lens optical axis 21 and the second lens optical axis 31 is within a predetermined alignment range. For example, alignment may be achieved when an angle of deviation a is less than about 1,000 µrad, less than about 500 µrad, less than about 100 µrad, less than about 10 µrad, less than about 1 µrad, etc. The predetermined threshold angle of deviation a may depend on the specific constraints or end use of the optical assembly 10.

In the embodiments described herein, the first lens 20 may be a convex lens (e.g., biconvex, equi-convex, plano-convex, convex-concave, meniscus, or the like) such that at least one surface of the first lens 20 through which the first lens optical axis 21 extends is convex. For example, the first lens 20 may include a first lens first surface 22 and a first lens coupling surface 24 opposite the first lens first surface 22. In particular, the first lens coupling surface 24 may be a convex coupling surface.

It is noted that while opposing surfaces (i.e., the first lens first surface 22 and the first lens coupling surface 24) of the first lens 20 are shown to be convex, in embodiments, only one surface of the first lens 20 may be convex while the opposite surface is planar or concave. In embodiments where opposing surfaces of the first lens 20 are both convex, the radii of the curved surfaces may be the same or different.

The second lens 30 may be a concave lens (e.g., biconcave, equi-concave, plano-concave, meniscus, convex-concave, etc.) such that at least one surface of the second lens 30 through which the second lens optical axis 31 extends is concave. For example, the second lens 30 may include a second lens first surface 34 and a second lens coupling surface 32 opposite the second lens first surface 34. In particular, the second lens coupling surface 32 may be a concave coupling surface.

It is noted that while opposing surfaces (i.e., the second lens first surface 34 and the second lens coupling surface 32) of the second lens 30 are shown to be concave, in embodiments, only one surface may be concave while the opposite surface is planar or convex. In embodiments where the opposing surfaces of the second lens 30 are both concave, the radii of the curved surfaces may be the same or different.

Still referring to FIGS. 1A and 1B, the concave coupling surface 32 of the second lens 30 may be bonded to the convex coupling surface 24 of the first lens 20 with an optical adhesive 40. In embodiments, the concave coupling surface 32 and the convex coupling surface 24 may have similar radii such that the convex coupling surface 24 of the first lens 20 nests within the concave coupling surface 32 of the second lens 30.

When the optical assembly 10 includes only a first lens 20 and a second lens 30, as illustrated in FIGS. 1A and 1B, the optical assembly 10 may be referred to as a doublet. However, it is noted that additional lenses may be added to the optical assembly 10. For example, a third lens may be coupled to a free surface of the optical assembly 10 (e.g., the third lens may be coupled to the first lens first surface 22 or the second lens first surface 34). The third lens may be convex, concave, or planar, to mate with the surface of the first lens 20 or the second lens 30. An optical assembly 10 with three lenses may be referred to as a triplet. The third lens may be adhered to the optical assembly 10 using the same or a different optical adhesive than that used to bond the first lens 20 to the second lens 30. It is noted that a greater number of lenses may be coupled to one another to form an optical assembly.

As noted above, an optical adhesive 40 is provided to bond the first lens 20 to the second lens 30. Properties of the optical adhesive 40 (e.g., index, thickness, coefficient of thermal expansion, etc.) used in joining the lenses of the optical assembly 10 may affect optical performance. In particular, optical adhesives may be chosen to enhance the salient properties of the final optical assembly. Optical adhesives may also be chosen based on properties of the adhesive that may affect manufacturability of the optical assembly 10 such as, for example, cure time, cure temperature, shrinkage, etc. Accordingly, depending on the specific application, any commercially available optical adhesive may be used. In embodiments, optical adhesives may be provided as a liquid. The optical adhesive 40 may be applied between the lenses and, thereafter, cured (e.g., through UV curing, IR curing, thermal curing, timed curing, etc.) once the desired alignment between the lenses is achieved. In embodiments, the optical adhesive 40 may have a pre- or un-cured viscosity of less than about 500 cps or from about 10 cps to 500 cps. However, it should be understood that other viscosities for the optical adhesive 40 are contemplated and possible. In some embodiments, the optical adhesive 40 may be applied in a layer about 10 μm to about 15 μm thick.

As noted above, manufacturing optical assemblies with two or more lenses may be tedious. In particular, it may be difficult to properly align the respective optical axes of the various lenses. In addition, curing the optical adhesive 40 during alignment may affect the optical properties of the optical assembly 10. Conventionally, one technique for providing stable positioning of the lenses during assembly is to use a viscous adhesive, which may allow for damping of positioning drift (e.g., slide off) of the lenses relative to on another. However, such viscous adhesives may have poor optical characteristics relative to lower viscosity adhesives. Another technique may be to partially cure the optical adhesive 40, which can increase the viscosity of the optical adhesive 40 and improve the reaction of the lenses to forces during alignment. However, optical properties of the optical adhesive 40 may be adversely affected by introducing shear stress or compression during the partially cured stage, which may result in stress birefringence in the optical assembly 10. The introduction of stress and the resulting stress birefringence degrades the optical quality of the optical assembly 10. For example, stress birefringence may induce a change in the polarization state of the transmitted light. Embodiments provided herein may include the alignment of the optical axes of the various components of the optical element with the optical adhesive 40 in a liquid, uncured state, to reduce or substantially eliminate the introduction of stresses during the alignment phase. Accordingly, a reduced stress profile within the optical assembly 10 may be achieved as opposed to an optical assembly wherein alignment is performed while the optical adhesive 40 is at least partially cured.

For example, the optical adhesive 40 may be provided as a liquid adhesive that is coated or otherwise applied to the first lens coupling surface 24, the second lens coupling surface 32, or combinations thereof. While the optical adhesive 40 is in an uncured, liquid state, the first lens optical axis 21 and the second lens optical axis 31 may be aligned, using the apparatuses and methods as will be described in greater detail herein. Once aligned to a predetermined alignment threshold, the optical adhesive 40 may be cured so as to rigidly fix the first lens 20 to the second lens 30. Because the optical adhesive 40 is provided in a liquid, uncured state, the optical adhesive 40 may act as a liquid bearing, which supports movement of the first lens 20 and/or the second lens 30 to align their respective optical axes 21, 31. Accordingly, undue stress introduced into the optical assembly 10 and corresponding stress birefringence may be avoided.

Figure 2A:
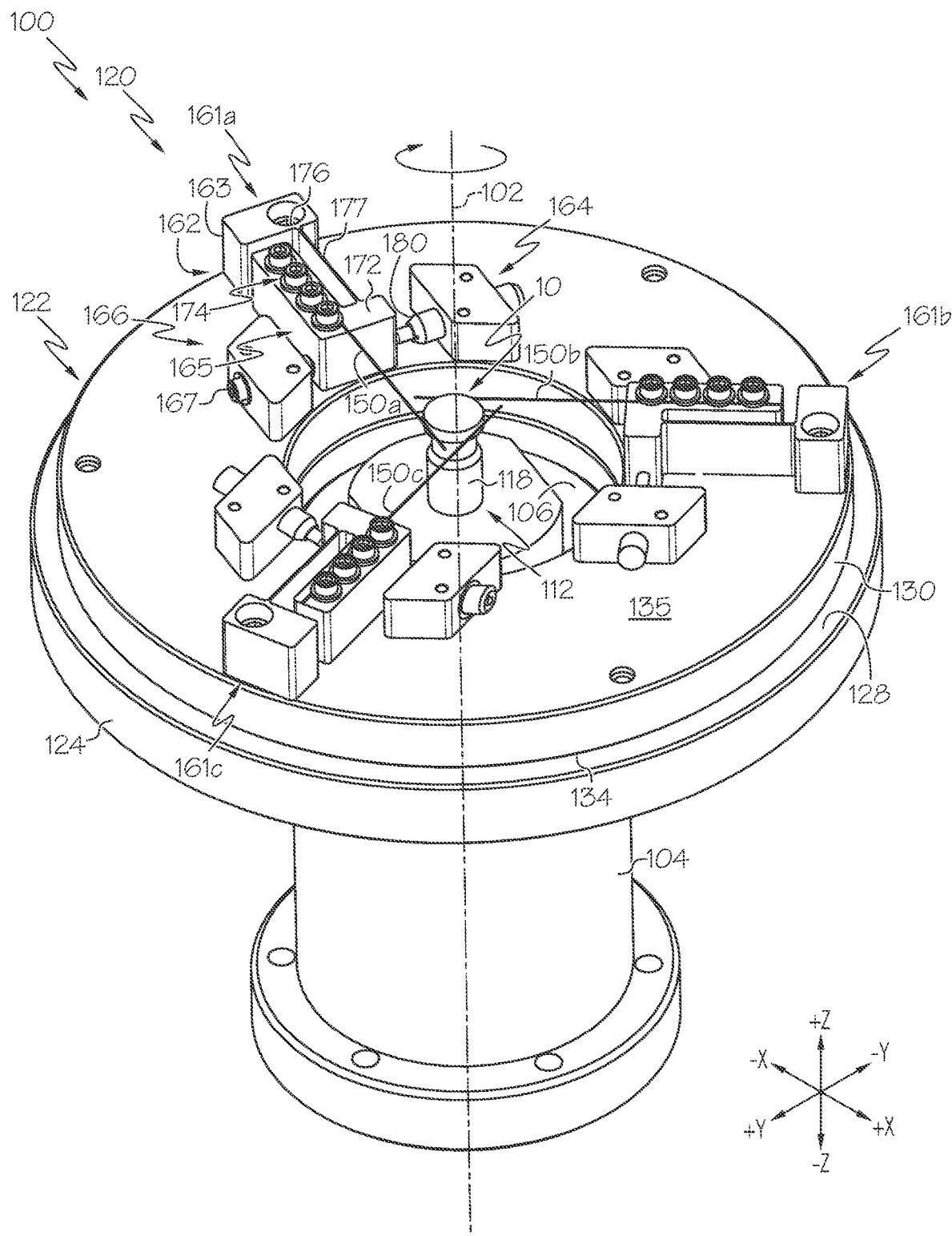
FIG. 2A depicts an alignment apparatus for aligning components of an optical assembly, according to one or more embodiments shown and described herein.
Figure 2B:
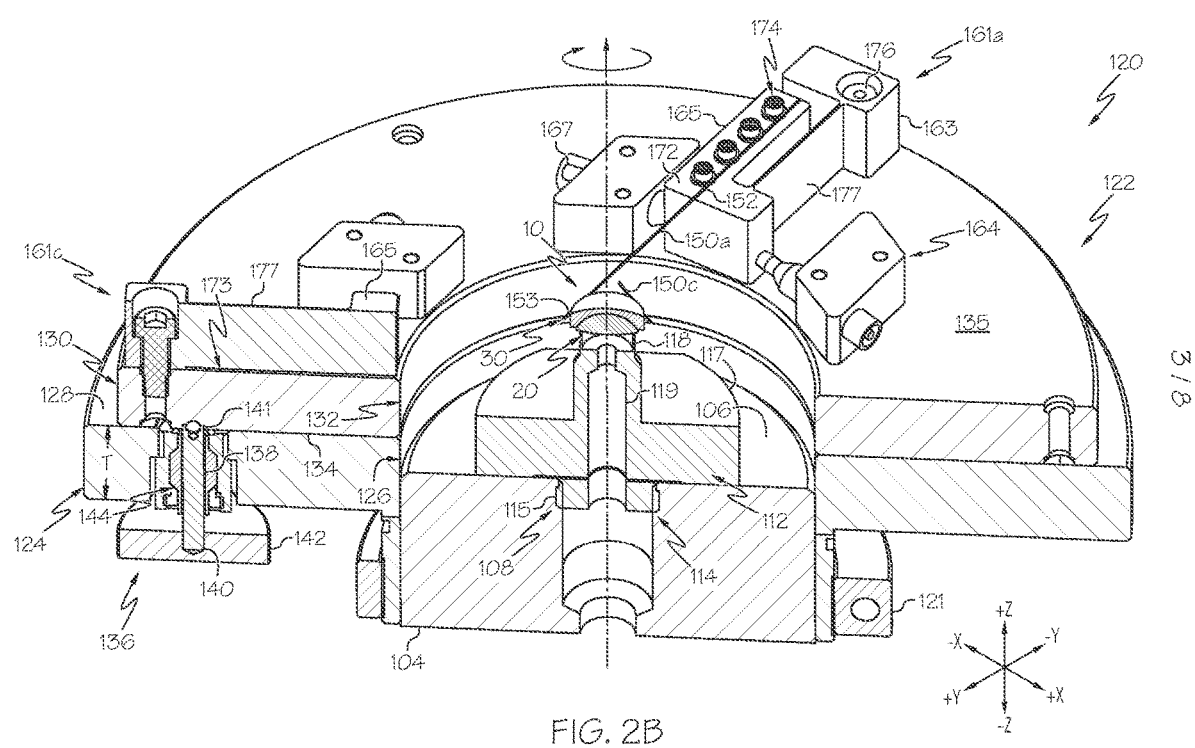
FIG. 2B depicts a cross-section of the alignment apparatus of FIG. 2A, according to one or more embodiments shown and described herein.

Referring now to FIGS. 2A and 2B, an embodiment of an alignment apparatus 100 for aligning optical axes of two or more components of an optical assembly 10 is schematically depicted. The alignment apparatus 100 generally includes a chuck 112 and an adjustable flexure assembly 120. A "chuck" as used herein is any device that holds a work piece (e.g., a lens) in place. The chuck 112 and the adjustable flexure assembly 120 may be mounted to a rotation mechanism (e.g., a rotating platform, rotational bearing, or the like) defining a datum axis 102. A "datum axis" as used herein is an axis to which geometric and/or dimensional tolerances are referenced to. The chuck 112 and the adjustable flexure assembly 120 may be mounted on the rotation mechanism to rotate on a common axis of rotation, which corresponds to the datum axis 102 for alignment of components of the optical assembly 10. The chuck 112 and the adjustable flexure assembly 120 may rotate around the datum axis 102 in synchronization with one another. For example and without limitation, a column 104 supporting both the chuck 112 and the adjustable flexure assembly 120 may be coupled to a motor (not shown) which may be controlled (e.g., through an electronic controller) to rotate the chuck 112 and the adjustable flexure assembly 120. In embodiments, the chuck 112 and the adjustable flexure assembly 120 may be freely rotatable (e.g., via a bearing) through manual actuation (e.g., such as a turntable). In embodiments, the alignment apparatus 100 may be aligned with or otherwise define the datum axis 102 without rotating around the datum axis 102.

The column 104 may comprise an upper surface 106 on which the chuck 112 may be mounted. In embodiments, the column 104 and the chuck 112 may be integral with one another. In embodiments, the column 104 and the chuck 112 may be separate components that may mate with one another to rigidly couple the chuck 112 to the column 104. For example and with reference to FIG. 2B, the column 104 may define a chuck receiving opening 108 configured to receive a mating portion 114 of the chuck 112 therein. For example, the mating portion 114 may nest within the chuck receiving opening 108 of the column 104. In embodiments, a retention tab 115 may engage with the chuck receiving opening 108 to inhibit withdrawal of the chuck 112 in the +Z direction of the depicted coordinate axes. Other engagement mechanisms (e.g., fasteners, welding, brazing, or the like) may be used to mount the chuck 112 to the column 104.

The chuck 112 is configured to support an optical assembly 10 thereon. For example, the chuck 112 may comprise a support portion 118 that is configured to engage with and hold the optical assembly 10 thereon. For example, the support portion 118 may be a tubular wall extending from a body 117 of the chuck 112. The tubular wall may be configured so as to only contact a portion of a surface of the optical assembly 10 (e.g., a surface of the first lens 20). The tubular shape of the wall may allow for the avoidance of contact with a quality area of the first lens 20 (e.g., an area toward a center of curvature of the first lens 20), thus preserving the surface quality and optical performance of the first lens 20. It is noted that the tubular wall may have any cross section (e.g., circular, elliptical, rectangular, or other regular or irregular polygonal shapes) without departing from the scope of the present disclosure.

In embodiments, the optical assembly 10 is secured to the chuck 112 through one or more securing means. Such securing means may include, for example and without limitation, a temporary adhesive, vacuum pressure, or the like. When vacuum pressure is used, the chuck 112 may be plumbed to a vacuum pressure source (not shown) such that vacuum pressure may be achieved through the support portion 118 of the chuck 112 to hold an optical assembly 10 to the chuck 112. In some embodiments, a vacuum channel 119 may extend from the support portion 118 of the chuck 112 and through the column 104, to provide fluidic communication between the vacuum pressure source (not depicted) and the support portion 118 of the chuck 112.

Referring again to FIG. 2A, the adjustable flexure assembly 120 may be disposed around the chuck 112 and includes a plurality of flexures (e.g., flexures 150a, 150b, 150c) that are configured to contact a component (e.g., a lens) of the optical assembly 10 positioned on the chuck 112. A "flexure," as used herein, is a flexible element that is elastically displaceable and recoverable in at least one plane.

For example, the plurality of flexures 150*a*, 150*b*, 150*c* may be elastically displaceable and recoverable in a plane that is parallel to at least a portion of each of the plurality of flexures 150*a*, 150*b*, 150*c*. For example, FIG. 2A illustrates each of the flexures 150*a*, 150*b*, 150*c* extending parallel to the X-Y plane of the depicted coordinate axes. The flexures 150*a*, 150*b*, 150*c* are elastically displaceable and recoverable within the X-Y plane to contact an edge of the optical assembly 10 to cause adjustment of the alignment of the optical assembly 10. In yet further embodiments, the plurality of flexures 150*a*, 150*b*, 150*c* may be elastically displaceable and recoverable through other or multiple planes (e.g., an X-Z plane, a Y-Z plane, and/or any plane angled with respect to the X-Y plane, the X-Z plane, and or the Y-Z plane).

Each flexure 150*a*, 150*b*, 150*c* may be coupled to a corresponding flexure clamp 162 (described in greater detail herein) and cantilevered therefrom. For example, with reference to flexure 150*a*, a first end 152 of the flexure 150*a* may be rigidly held by a dedicated flexure clamp 162 and a second end 153 of the flexure 150*a* may extend past the support portion 118 of the chuck 112 so as to be cantilevered from the end of the flexure clamp 162. The length at which the flexure 150*a*, 150*b*, 150*c* extends from the corresponding flexure clamp 162 may be dependent upon the size of the optical assembly 10 being aligned. For example, each flexure 150*a*, 150*b*, 150*c* may extend so as to tangentially contact an edge of the optical assembly 10, or a sub-component thereof (e.g., second lens 30), when the optical assembly 10 is disposed in the chuck 112. In some embodiments, it is contemplated that one or more flexures 150*a*, 150*b*, and/or 150*c* may be oriented to the edge of the optical assembly 10 in a direction normal to the edge of the optical assembly 10. In some embodiments, the plurality of flexures 150*a*, 150*b*, 150*c* may be positioned so as to be oriented perpendicular to the vertical axis (e.g., the Z-axis of the depicted coordinate axis) and radially contact the edge of the optical assembly 10.

Each flexure 150*a*, 150*b*, 150*c* may be made from a resilient material configured to impart a force onto one or more components of the optical assembly 10. For example, each flexure 150*a*, 150*b*, 150*c* may be a wire made from steel, plastic, or the like. Each flexure may have a round, square, rectangular, or any other cross-section. Additionally, while each flexure is depicted as a straight wire, in various embodiments, the flexures may have various contoured shapes (e.g., curved, hooked, s-shaped, o-shaped, etc.). Contact of the plurality of flexures 150*a*, 150*b*, and/or 150*c* with the optical assembly 10 may cause one or more of the flexures to bend. Because the flexures 150*a*, 150*b*, 150*c* are resilient, they resist bending, and so impart a radial adjusting force to the component of the optical assembly 10 that the flexures 150*a*, 150*b*, 150*c* are contacted with. While it is contemplated that the plurality of flexures 150*a*, 150*b*, and/or 150*c* may deflect when contacted with the optical assembly 10, such deflection may be on a small scale. For example, the deflection or bending may be on a scale of tens of nanometers (e.g., less than about 10 mm, less than about 8 mm, less than about 6 mm, between about 1 nm and about 10 mm, e.g., between about 1 nm and about 8 mm, between about 1 nm and about 6 mm, etc.) relative to the initial position of the flexure 150*a*, 150*b*, 150*c*. The amount of deflection or bending is measured at the free end of the flexure 150*b*, 150*b*, 150*c* (i.e., the end of the flexure proximate to the optical assembly 10) and is the difference in the position of the flexure 150*a*, 150*b*, 150*c* prior to bending (i.e., the initial position) and after bending (i.e., the final position). Because the sub-component (e.g., second lens 30) of the optical assembly 10 is not initially aligned (e.g., the optical axes are not aligned within tolerance), the imbalance of forces provided by the plurality of flexures 150*a*, 150*b*, 150*c* guides the optical component into the desired alignment.

Each flexure 150*a*, 150*b*, 150*c* may have a flexural rigidity (or resiliency) which may be chosen based on the size of the lens and/or the viscosity of the optical adhesive 40 used to join the components of the optical assembly 10. For example, a larger lens may benefit from a more rigid flexure to affect adjustment, while a smaller lens may require a more flexible flexure to provide fine adjustment. Additionally, an optical adhesive 40 having a higher viscosity may benefit from a flexure with a higher flexural rigidity to overcome the damping force of the optical adhesive 40.

The adjustable flexure assembly 120 facilitates adjustment of a position of the one or more flexures 150*a*, 150*b*, and/or 150*c* of the plurality of flexures 150*a*, 150*b*, 150*c* relative to the support portion 118 of the chuck 112 to adjust an alignment of an optical axis of one or more components of the optical assembly 10 supported on the support portion 118 of the chuck 112. For example, to facilitate positional adjustment of the plurality of flexures 150*a*, 150*b*, 150*c*, the adjustable flexure assembly 120 may include a tip-tilt assembly 122. The tip-tilt assembly 122 may include a base plate 124, an adjustable plate 130, and one or more adjustment actuators 136 (shown in FIG. 2B). As will be described in greater detail herein, the adjustable plate 130 may be tilted relative to the base plate 124 to adjust the position of the plurality of flexures (150*a*, 150*b*, 150*c*) coupled thereto.

The base plate 124 may comprise a base plate aperture 126 for slidably receiving the column 104 and the chuck 112 therethrough. For example, the base plate 124 may be positionable in the +/−Z direction of the depicted coordinate axes along the column 104. For example, the base plate 124 may slide to a desired position along the column 104 and then be fixed relative thereto by fixing structure 121 (e.g., a bracket, collar, clamp, or the like).

The base plate 124 may define a support surface 128 upon which the adjustable plate 130 may be positioned. It is noted that while the base plate 124 is depicted as round, the base plate 124 may be any shape (e.g., elliptical, rectangular, or any regular or irregular polygonal shape) without departing from the scope of the present disclosure. As illustrated, the base plate aperture 126 is sized to allow passage of the column 104 and chuck 112 therethrough to allow for height adjustment of the base plate 124 in the +/−Z direction of the depicted coordinate axes relative to the column 104. By positioning the base plate 124 relative to the column 104, the entire tip-tilt assembly 122 can be move relative to the support portion 118 of the chuck 112. Accordingly, optical assemblies of different dimensions may be aligned using the alignment apparatus 100. That is, as additional lenses are added to the optical assembly 10 positioned on the support portion 118 of the chuck 112, the base plate 124 may be moved up the column 104 in the +Z direction of the depicted coordinate axes to allow for adjustment of the added lens.

Additionally, and to facilitate adjustment of the entire tip-tilt assembly 122 relative to the column 104, the adjustable plate 130 may define an adjustable plate aperture 132 that aligns with the base plate aperture 126 of the base plate 124 such that a continuous opening extends through the base plate 124 and the adjustable plate 130. It is noted that while the base plate aperture 126 and the adjustable plate aperture 132 are illustrated as having substantially equal diameters, in embodiments the base plate aperture 126 and the adjustable plate aperture 132 may have different diameters.

The adjustable plate 130 may be coupled to the base plate 124 through the one or more adjustment actuators 136. As used herein, adjustment actuators include any devices that are configured or otherwise capable of adjusting a position (e.g., a tilt, or a position) of the adjustable plate 130 relative to the support surface 128 of the base plate 124. The one or more adjustment actuators 136 may include any actuators capable of tilting or otherwise adjusting a position of the adjustable plate 130 relative to the support surface 128 of the base plate 124. In embodiments, the one or more adjustment actuators 136 may include several adjustment actuators. In embodiments, the number of adjustment actuators may correspond to the number of flexures disposed on the adjustable plate 130. For example, where there are three flexures 150a, 150b, 150c there may be three adjustment actuators corresponding to a position of the three flexures 150a, 150b, 150c to allow for fine adjustment of the position of each flexure 150a, 150b, 150c.

FIG. 2B illustrates a particular example of an actuator of the one or more adjustment actuators 136. In such embodiments, the one or more adjustment actuators 136 may include a push bar 138 (e.g., a fine pitch screw) that extends through a thickness T of the base plate 124 to contact an underside surface 134 of the adjustable plate 130. The push bar 138 may include a first end 140 and a second end 141. The first end 140 of the push bar 138 may be coupled to an adjuster 142 (e.g., crank, knob, rotary actuator, etc.) configured to adjust a length of the push bar 138 which extends through the support surface 128 of the base plate 124 by rotating the push bar 138.

The second end 141 of the push bar 138 may extend through the support surface 128 of the base plate 124 and contact the underside surface 134 of the adjustable plate 130. In embodiments, the second end 141 of the push bar 138 may be coupled (e.g., pivotably coupled) to the underside surface 134 of the adjustable plate 130 to allow the adjustable plate 130 to tilt around the second end 141 of the push bar 138 without detaching therefrom.

Figure 2C:
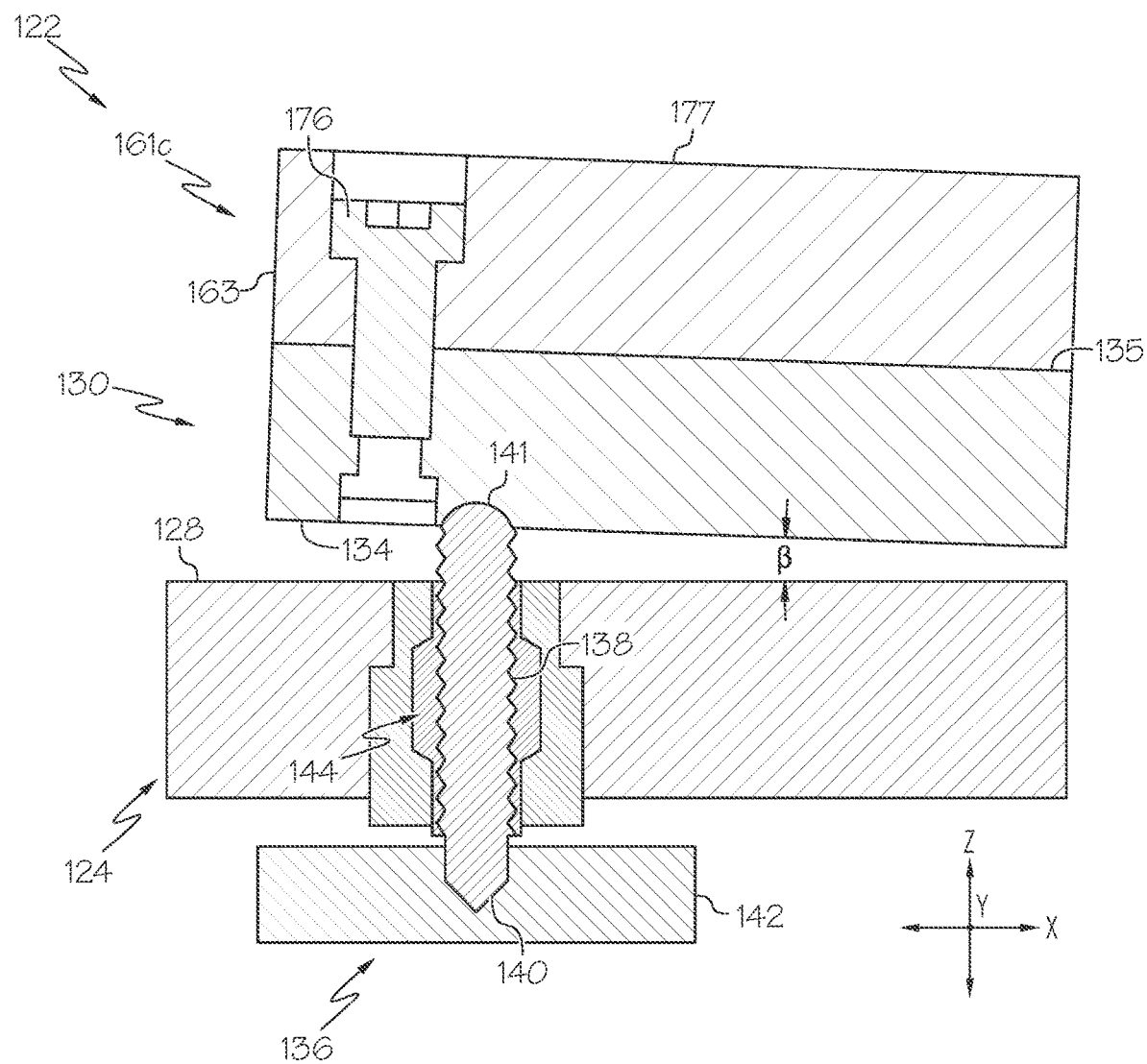
FIG. 2C depicts a partial cross-section of the alignment apparatus of FIG. 2A illustrating a tilted configuration, according to one or more embodiments shown and described herein.

In embodiments, the push bar 138 may be threaded along its length between the first end 140 and the second end 141. The thread may engage a threaded passage 144 extending through the base plate 124. In such embodiments, a twisting motion of the push bar 138 may allow the push bar 138 to traverse the threaded passage 144 to extend through the support surface 128 of the base plate 124 and push the adjustable plate 130 away from contact with the base plate 124. Accordingly, the adjustable plate 130 may be tilted at a tilt angle β relative to the support surface 128 of the base plate 124, as illustrated in FIG. 2C. When in contact with a lens, tilting the adjustable plate 130 may cause the plurality of flexures 150a, 150b, and/or 150c to push or tilt a position of the lens to which they are contacted to urge the lens into a position to align the optical axis of the contacted lens (e.g., the second lens 30) with the optical axis of the first lens 20.

Referring again to FIG. 2A, each flexure (150a, 150b, 150c) of the plurality of flexures may be part of a flexure assembly (e.g., flexure assembly 161a, 161b, or 161c) that is coupled to an upper surface 135 of the adjustable plate 130. In the illustrated embodiment there is provided a first flexure assembly 161a, a second flexure assembly 161b, and a third flexure assembly 161c. However, there may be a fewer or greater number of flexure assemblies without departing from the scope of the present disclosure. Each of the flexure assemblies 161a, 161b, and 161c may include the flexure clamp 162, a sliding actuator 164, and a stop 166. That is, the alignment apparatus 100 may include a plurality of flexure clamps, a plurality of sliding actuators, and a plurality of stops. It is noted that each of the flexure assemblies 161a, 161b, 161c may be substantially identical to one another and circumferentially spaced around the chuck 112.

As used herein, a "flexure clamp" may include any device capable of mounting a flexure (e.g., flexure 150a, 150b, and/or 150c) to the adjustable plate 130. The flexure clamp 162 may include a fixed portion 163 fixedly coupled to the upper surface 135 of the adjustable plate 130 and a sliding portion 165 configured to slidably move across the upper surface 135 of the adjustable plate 130 in response to an application of force to the sliding portion 165. To facilitate such sliding movement, the sliding portion 165 may be coupled to the fixed portion 163 via a flexible webbing 177. As used herein the term "flexible webbing" is the portion of the flexure clamp 162 having a reduced cross-section relative to the fixed portion 163 of the flexure clamp 162. The reduced cross-section allows the flexible webbing 177 to be elastically displaceable and recoverable in at least one plane. In embodiments, the flexible webbing 177 may be integral with the sliding portion 165 and the fixed portion 163 or may be a separate article coupled to the sliding portion 165 and the fixed portion 163 via any coupling technique (adhesive, welding, fasteners, etc.). For example, the flexure clamp 162 may be milled or otherwise formed from the same block of material (e.g., plastic, metal, etc.) such that the fixed portion 163, the sliding portion 165, and the flexible webbing 177 are integrally formed. The flexible webbing 177 may have a thickness of about 3 mm or (e.g., about 2 mm or less, about 1 mm or less, etc.). As noted above, the flexible webbing 177 is elastically displaceable and recoverable in at least one plane. In particular, the flexible webbing 177 may be elastically displaceable and recoverable in a plane that is parallel to the upper surface 135 of the adjustable plate 130. Stated another way, the flexible webbing 177 may comprise a flexural rigidity that provides some resistance to bending and a tendency to resume its previous shape prior to bending. Such flexural rigidity may allow for fine (nanometer scale) adjustments to the portion of the sliding portion 165 across the upper surface 135 of the adjustable plate 130.

The fixed portion 163 of the flexure clamp 162 may be immovably coupled to the adjustable plate 130 with for example, a bolt 176 or other coupling device or method (e.g., fastening, adhering, brazing, welding, etc.). The sliding portion 165 may define a flexure support surface 172 to support a flexure (e.g., flexure 150a) thereon. The sliding portion 165 may comprise a clamping device 174 configured to fix a position of the flexure 150a to the flexure support surface 172. Accordingly, the clamping device 174 may include any device configured to rigidly hold a portion of the flexure 150a to the sliding portion 165. For example, one or more bolts may be coupled to the sliding portion 165 to clamp the flexure 150a to the sliding portion 165 with a flange (or washer) of the one or more bolts.

During adjustment, the sliding portion 165 is configured to slide across the upper surface 135 of the adjustable plate 130 when a force acts thereon, which introduces a bending moment in the flexible webbing 177. This may allow for positioning of the flexure 150a relative to the optical assembly 10 supported on the chuck 112 such that alignment of different sized optical assemblies (e.g., optical assemblies with larger or smaller diameters (e.g., less 8 mm)) may be facilitated.

A sliding actuator 164 may be coupled to the upper surface 135 of the adjustable plate 130. As used herein, a "sliding actuator" may include any device that is capable or sliding or displacing the sliding portion 165 of the flexure clamp 162 to a desired position relative to the adjustable plate 130. For example, the sliding actuator 164 may be positioned on one side of the sliding portion 165 of the flexure clamp 162. The sliding actuator 164 may include a plunger 180 (e.g., a fine pitch screw) which can be extended or retracted (e.g., manually with a handle, crank, or similar device or with an electronic actuator). The plunger 180 may contact the sliding portion 165 of the flexure clamp 162 and push the sliding portion 165 thereby introducing a bending moment in the flexible webbing 177, which displaces the sliding portion 165 to the desired position. In some embodiments, the plunger 180 may be coupled to the sliding portion 165 of the flexure clamp 162 to facilitate sliding of the sliding portion 165 in a clockwise and/or counter clockwise direction about the fixed portion 163 across the upper surface 135 of the adjustable plate 130. In other embodiments, the plunger 180 may not be coupled to the sliding portion 165 of the flexure clamp 162. For example, the plunger 180 may only contact the sliding portion 165 of the flexure clamp 162 to move the sliding portion 165 of the flexure clamp 162 across the upper surface 135 of the adjustable plate 130 and then be moved out of contact with the sliding portion 165 of the flexure clamp 162 to allow the sliding portion 165 to be biased by the flexible webbing 177 back to its original position. The plunger 180 may be controllably positioned via an electronic, pneumatic, or hydraulic actuator, with an electronic controller or may be manually advanced and/or retracted.

The stop 166 may be coupled to the adjustable plate 130 proximate to the sliding portion 165 and on an opposite side of the sliding portion 165 of the flexure clamp 162 from the sliding actuator 164. The stop 166 may be positioned so as to limit further displacement of the sliding portion 165 of the flexure clamp 162 about the fixed portion 163 in the clockwise direction, for example. The stop 166 may include stopper member 167 (e.g., a bolt, set screw, spring, etc.) or similar structure that can be advanced into contact with the sliding portion 165 of the flexure clamp 162 to rigidly hold the sliding portion 165 of the flexure clamp 162 in the desired position between the sliding actuator 164 and the stop 166. Similar to the plunger 180, the stopper member 167 may be controllably positioned via an electronic, pneumatic, or hydraulic actuator, with an electronic controller or may be manually advanced and/or retracted.

During use, the sliding portions 165 of the flexure clamps 162 can be moved by the one or more sliding actuators 164 to contact the plurality of flexures 150a, 150b, 150c with the tops lens (e.g., the second lens 30) of the optical assembly 10. Such contact may introduce a bending moment into one or more flexures 150a, 150b, and/or 150c of the plurality of flexures 150a, 150b, 150c, which causes the top lens to be urged into a desired alignment. To mitigate the inducement of stresses within components of the optical assembly 10 or the optical adhesive 40 during alignment, the force applied by the plurality of flexures 150a, 150b, 150c to the optical assembly 10 may be relatively low. For example, a force/displacement ratio of the each flexure (150a, 150b, 150c) of the plurality of flexures 150a, 150b, 150c may be equal to about $1.0 \times 10^{-6}$ N/mm to about $2 \times 10^{-6}$ N/mm. The bending of a flexure may be proportional to a length of the flexure to the third power and inversely proportional to the diameter of the flexure to the fourth power. For example, a steel flexure having a diameter of 0.25 to 0.5 mm and a length of about 20 to about 40 mm provides a length to diameter ratio of about 80:1 to about 160:1, when displacing a lens having a mass of less than 10 grams, the force/displacement ratio may be approximated using conventional beam bending calculations. As noted above, such force/displacement ratio may be equal to about $1.0 \times 10^{-6}$ N/mm to about $2 \times 10^{-6}$ N/mm and may provide enough force for fine (e.g., micro-radian or sub-micron level) adjustments and sufficient friction to maintain contact with the optical assembly 10. It is noted that the greater the bending of the flexure, the less force it applies to the component of the optical assembly 10. Conversely too little bending may not allow for fine adjustments to align the optical axes of the optical assembly 10.

It is noted that the plurality of flexures 150a, 150b, and 150c may be moved into contact with a component of the optical assembly 10 such that only a single flexure of the plurality of flexures 150a, 150b, and 150c bends thereby providing increased force on the optical assembly 10 at that flexure. However, the total resultant force acting on the optical assembly 10 does not change significantly as the two opposite flexures (e.g., non-bending flexures) balance the increased force of the single bending flexure. This imbalance causes the component of the optical assembly 10 in contact with the plurality of flexures 150a, 150b, 150c to move into alignment while maintaining a low stress condition within the optical assembly 10.

Figure 4A:
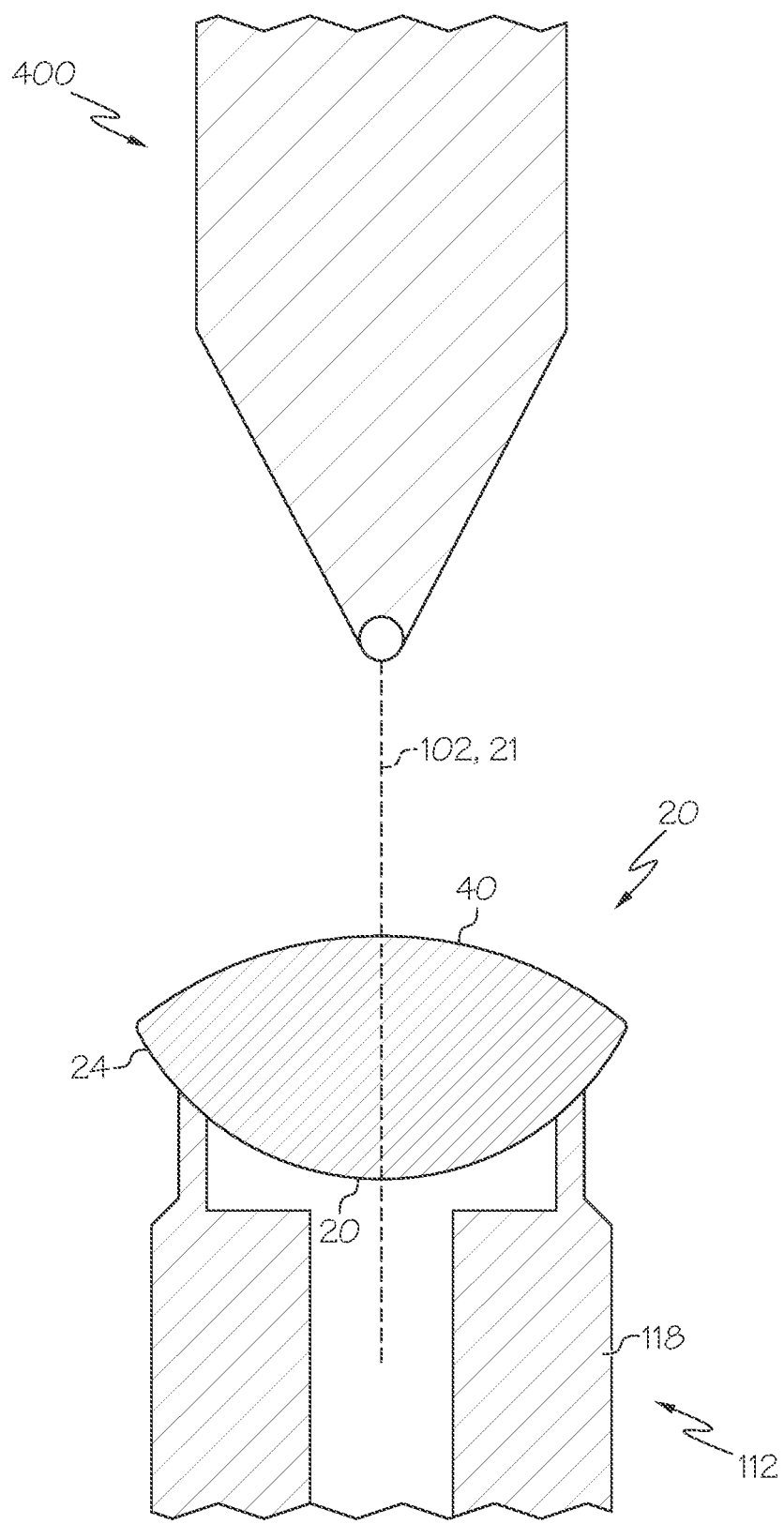
FIG. 4A depicts a first lens positioned on a chuck of the alignment apparatus, according to one or more embodiments shown and described herein.
Figure 4B:
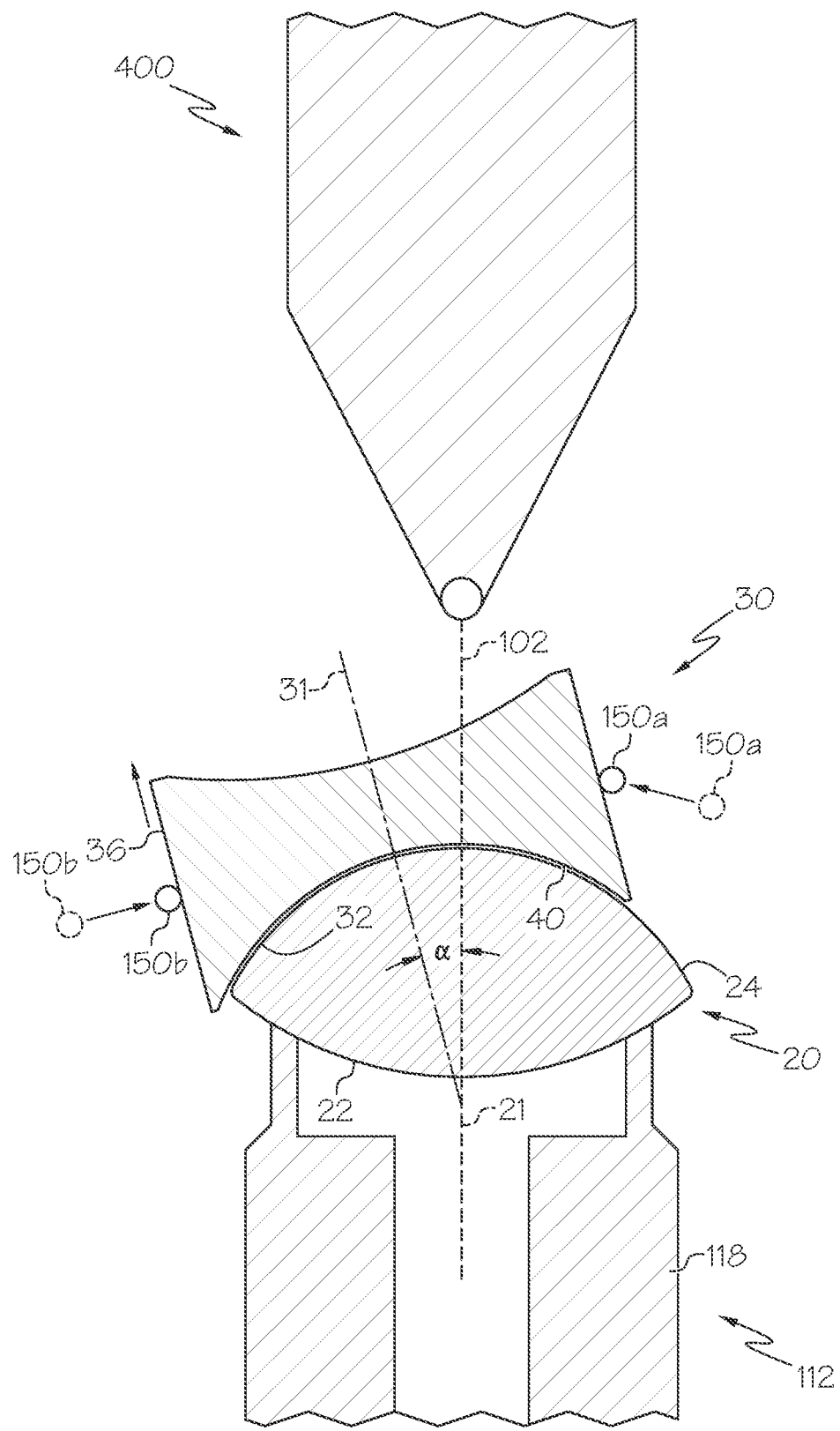
FIG. 4B depicts a second lens positioned on the first lens of FIG. 4A, according to one or more embodiments shown and described herein.
Figure 4C:
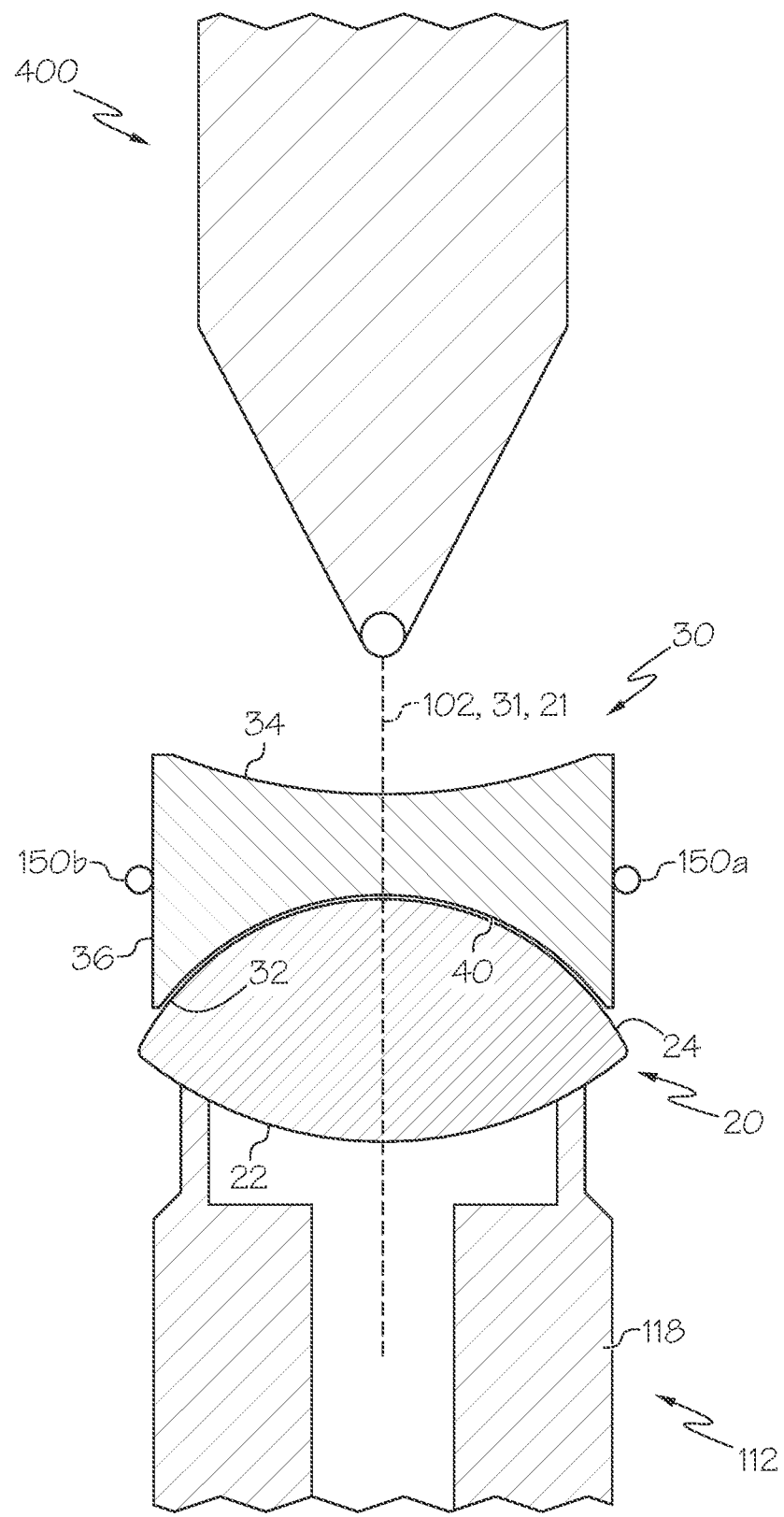
FIG. 4C depicts alignment of the first optical axis of the first lens with the second optical axis of the second lens, according to one or more embodiments shown and described herein.

Referring now to FIGS. 4A-4C, the alignment apparatus 100 may further include a centration measurement apparatus 400, such as an alignment telescope, a displacement measuring sensor, or other metrology devices, configured to measure an optical axis alignment of one or more components of an optical assembly. For example, a commercially available Trioptics OpticCentric® Measuring Device uses a light signal directed into the optical article to determine the location of an optical axis of the top lens and provide feedback as to the alignment. The centration measurement apparatus 400 may detect or otherwise measure the location of an optical axis of the top lens relative to the datum axis 102 and provide feedback of position to a user, an electronic controller, or a combination thereof. Based on this information, the user, or the electronic controller can adjust the positions of the one or more flexures 150a, 150b, and/or 150c (e.g., with the one or more adjustment actuators 136 and/or the one or more sliding actuators 164) to align the optical axes 21, 31 as desired. As shown in FIGS. 4A-4D the centration measurement apparatus 400 may be positioned over the support portion 118 of the chuck 112 to measure optical alignment of an optical assembly 10 positioned thereon.

Figure 3:
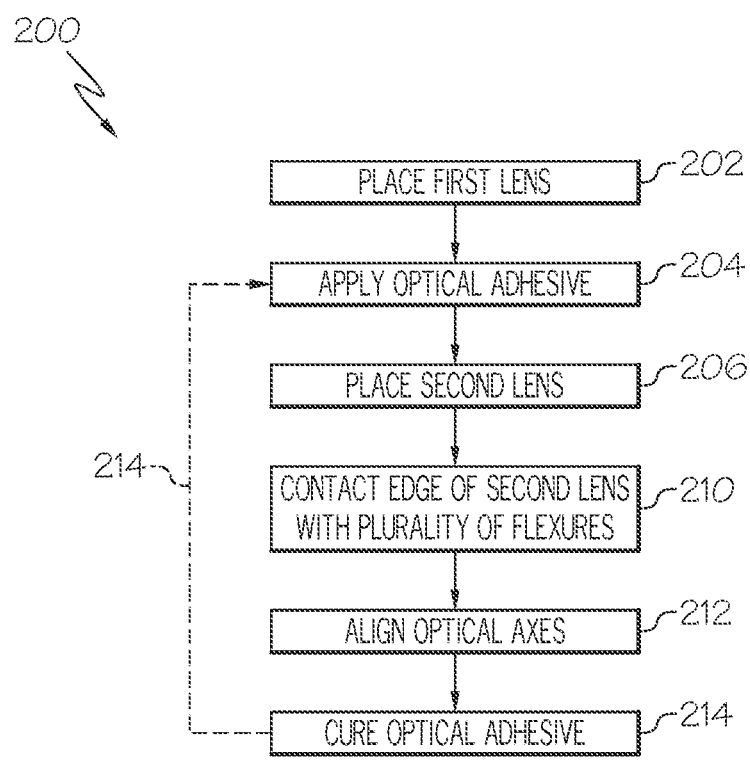
FIG. 3 illustrates a flow chart of a method of aligning components of an optical assembly, according to one or more embodiments shown and described herein.

FIG. 3 depicts a flow chart of a method 200 for aligning components of an optical assembly 10. It is noted that while the method 200 illustrates a number of steps in a specific order, it is noted that a greater or fewer number of steps may be performed without departing from the scope of the present disclosure. Additionally, such steps may be taken in a different order than depicted without departing from the scope of the present disclosure.

In a first step 202, a first lens 20 of an optical assembly 10 may be positioned on the support portion 118 of the chuck 112, as described above. As noted herein, the first lens 20 may be held in place using, for example, vacuum pressure. The first lens optical axis 21 may be aligned with the datum axis 102 of the assembly. For example, using the centration measurement apparatus 400, the alignment of the first lens optical axis 21 of the first lens 20 may be determined and positioned so as to be aligned with the Z-axis of the depicted coordinate axes. In the illustrated embodiment, the first lens 20 is a bi-convex lens. It is noted that placing a convex side of the first lens 20 into contact with the chuck 112 may allow the chuck 112 to better seal against the lens. It is also noted the first lens 20 may be any other type of lens as described herein.

Once aligned and mounted to the chuck 112, the first lens coupling surface 24 of the first lens 20 may be coated with an optical adhesive 40, as described herein, at step 204. The optical adhesive 40 may be applied in a liquid state. At step 206, the second lens 30 may be placed on the first lens 20. The second lens coupling surface 32 of the second lens 30 may also be coated with the liquid optical adhesive 40. The second lens 30 may be a concave lens so as to mate with a convex surface of the first lens 20. During initial engagement of the first lens 20 with the second lens 30, the plurality of flexures (150a, 150b, 150c) may be positioned so as to not contact any portion of the optical assembly 10. As shown in FIG. 4B, once the second lens 30 is positioned on the first lens 20, an operator may move the plurality of flexures (150a, 150b, 150c) into contact with the edge 36 of the second lens 30, at step 210. As noted above, the plurality of flexures (150a, 150b, 150c) may be brought into contact with a top surface of the lens (such as when the top lens has a convex top surface and a very small edge surface) by application of force by the one or more sliding actuators 164 to the sliding portion 165 of the one or more flexure clamps 162 to introduce a bending moment in the flexible webbing 177 to allow the sliding portion 165 to slide across the upper surface 135 of the adjustable plate 130. It is noted that while the sliding portion 165 may slide across the upper surface 135 of the adjustable plate 130, the sliding portion 165 need not be in contact with the upper surface 135 of the adjustable plate 130. For example, and as illustrated in FIG. 2B, the sliding portion 165, and the flexible webbing 177 in some embodiments, may be spaced from the adjustable plate 130 in the Z direction of the depicted coordinate axes, such that an air gap 173 separates the sliding portion 165 and the upper surface 135 of the adjustable plate 130. Accordingly, friction between the sliding portion 165 and the adjustable plate 130 may be avoided. When sliding the sliding portion 165, the flexible webbing 177 may deflect a small amount (e.g., less than about 1 mm, less than 10 µm, less than 100 nm, etc.) to cause placement of the plurality of flexures 150a, 150c, 150b. Additionally, the tip-tilt assembly 122 may adjustment the tilt of the adjustable plate 130 relative to the base plate 124 for proper positioning of the one or more flexures 150a, 150b, 150c so as to contact a non-quality area of the lens. Avoiding contact to the quality area of the lens (e.g., away from the optical axis, may prevent unwanted damage to the quality area of the lens.

The centration measurement apparatus 400 may measure the optical axis alignment of the second lens optical axis 31 relative to the datum axis 102, to which the first lens optical axis 21 is aligned. Based on the feedback, which may be provided to the operator through a user interface such as a display, the operator, or an electronic controller, may adjust one or more flexures of the plurality of flexures (e.g., flexures 150a, 150b, and/or 150c) with, for example, the one or more adjustment actuators 136 and/or the one or more sliding actuators 164 to gently move the second lens optical axis 31 of the second lens 30 into alignment with the first lens optical axis 21 of the first lens 20 within tolerance, at step 212. As noted herein, movement of the second lens 30 into an aligned position may occur while the optical adhesive 40 is in a liquid, uncured state, such that the optical adhesive 40 acts as a liquid bearing to reduce the introduction of stress into the optical adhesive 40 layer, as may occur when the optical adhesive 40 is partially cured. Throughout measuring and alignment, the alignment apparatus 100 may be rotating about the datum axis 102 (e.g., at about 100 RPM). Once alignment is achieved within the preferred tolerance (which may take less than 15 minutes or between about 5 and 15 minutes), at step 214, the optical adhesive 40 may be cured (e.g., with IR-curing, time, UV-curing, or combinations thereof). After curing, the process may be repeated with additional lenses being added to the optical assembly 10. As noted above, the height of the adjustable flexure assembly 120 may be adjusted along the column 104 to facilitate adding additional lenses to the optical assembly 10.

In some embodiments, the optical adhesive 40 may be replaced with a temporary liquid acts as a liquid bearing to assist with alignment. Examples of temporary liquids include, but are not limited to, water, alcohol, hydroxide solutions, any combinations thereof, or the like. Such temporary liquids may evaporate to initiate very close contact of surfaces of the first and second lenses and/or enable chemical bonding at the atomic level between surfaces. For example, when proper alignment is achieved, as described above, the liquid may be allowed to evaporate such that the two opposing surfaces of the first lens 20 and the second lens 30 come into contact with one another while remaining aligned. An atomic or molecular level bonding (e.g., through diffusion bonding, optical contact bonding, chemically activated bonding, etc.) may then be achieved between the first lens 20 and the second lens 30 to provide an adhesive-free bond. That is, embodiments described herein may perform alignment using either an adhesive 40 or other low viscosity liquid (e.g., less than about 500 cps or from about 10 cps to 500 cps). Accordingly, any description provided above in regards to alignment using an optical adhesive is equally applicable to alignment using a temporary liquid that is later evaporated.

Alignment using the alignment apparatus 100 as described herein, may reduce stress in the optical assembly 10. As noted above, stress can cause birefringence, which induces a change in the polarization state of the transmitted light through the optical assembly 10. Alignment using the described methods and apparatuses allow for the polarization state of light transmission through assemblies or systems to be maintained to maximize the transmitted intensity or transmitted intensity uniformity for the system. This property may be quantified using a conventional light polarization measurement device (e.g., including, but not limited to, a polarized light source, one or more waveplates, an analyzing polarizer, and/or a detector) and an article or system under test to determine a polarized light transmission efficiency ratio, or inversely, an extinction ratio for certain polarization states. For example, the measurement of the polarization performance can be done with polarizers and intensity detectors for the appropriate wavelengths or with commercially available polarimeter equipment from, for example, Hinds Instruments™ (e.g., Stokes Polarimeters) or Ilis (e.g., Strain Scope®) for making optical retardance measurements. For example, an article with very little birefringence can be quantified with a very high extinction ratio (e.g., 10000:1 or greater) when evaluated with a linear polarizer measurement device. Optical assemblies with significant birefringence may exhibit extinction ratios on the scale of 100:1 or 200:1. Optical assemblies subjected to alignment methods and apparatuses as described herein exhibit extinction ratios of greater than 1000:1 (e.g., greater than 1200:1, greater than 1400:1, greater than 1600:1, etc.). However, optical assemblies produced with partially cured adhesives often have extinction ratios of less than 1000:1 or even less than 600:1. Accordingly, embodiments as described herein provide for reduced stress compared to optical assemblies aligned using a partially cured adhesive during alignment.

It should now be understood that embodiments provided herein are directed to apparatuses and methods for aligning components of an optical assembly. For example, an alignment apparatus for aligning components of an optical assembly may include a chuck configured to support the optical assembly thereon, and an adjustable flexure assembly. The adjustable flexure assembly may be disposed around the chuck and include a plurality of flexures. The plurality of flexures may are configured to contact an edge of the optical assembly. Adjustment of a position of one or more flexures of the plurality of flexures causes an adjustment in an optical axis alignment of one or more components of the optical assembly. Accordingly, alignment of the optical axis of the various components of the optical assembly may be achieved. Flexures may provide a subtle force to move the components of the optical assembly to encourage alignment. Such subtle contact may decrease force disturbances within an adhesive positioned between optical components, and provide for better quality optical assemblies.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An alignment apparatus for aligning components of an optical assembly, the alignment apparatus comprising:
   a chuck configured to support the optical assembly thereon; and
   an adjustable flexure assembly disposed around the chuck, the adjustable flexure assembly comprising a plurality of flexures, wherein:
      the plurality of flexures are positioned relative to the chuck such that each of the plurality of flexures is configured to contact the optical assembly when the optical assembly is positioned on the chuck, and each of the plurality of flexures is configured to deflect in response to the contact with the optical assembly; and
      adjustment of a position of one or more flexures of the plurality of flexures adjusts an alignment of an optical axis of an optical component of the optical assembly when the optical assembly is positioned on the chuck, wherein the alignment apparatus is configured to align optical axes of the optical component to an angle of deviation of less than about 1,000 μrad and provide an extinction ratio within the optical assembly of greater than or equal to 1000:1.

2. The alignment apparatus of claim 1, wherein the adjustable flexure assembly is rotatable around a datum axis.

3. The alignment apparatus of claim 2, wherein the chuck is rotatable around the datum axis.

4. The alignment apparatus of claim 1, wherein:
   the chuck comprises a vacuum channel; and
   the optical assembly is supported on the chuck by vacuum pressure provided through the vacuum channel.

5. The alignment apparatus of claim 1, wherein the adjustable flexure assembly further comprises a tip-tilt assembly disposed around the chuck, the tip-tilt assembly comprising:
   a base plate defining a support surface;
   an adjustable plate adjustably coupled to the base plate, the adjustable plate supporting the plurality of flexures thereon; and
   one or more adjustment actuators configured to adjust a position of the adjustable plate relative to the support surface of the base plate.

6. The alignment apparatus of claim 5, further comprising a column supporting the chuck thereon, wherein the adjustable flexure assembly is disposed around the column and is slidable along the column so as to be adjustably positioned along a length of the column.

7. The alignment apparatus of claim 5, wherein:
   the base plate defines a base plate aperture;
   the adjustable plate defines an adjustable plate aperture aligned with the base plate aperture; and
   the base plate aperture and the adjustable plate aperture are sized to allow passage of the chuck therethrough.

8. The alignment apparatus of claim 5, wherein the one or more adjustment actuators are configured to adjust a tilt of the adjustable plate relative to the support surface of the base plate.

9. The alignment apparatus of claim 5, further comprising a plurality of flexure clamps coupled to the adjustable plate.

10. The alignment apparatus of claim 9, wherein each flexure clamp is coupled to the adjustable plate and comprises:
    a fixed portion, fixedly coupled to the adjustable plate;
    a sliding portion, wherein a flexure of the plurality of flexures is coupled to the sliding portion; and
    a flexible webbing coupling the fixed portion to the sliding portion, wherein the adjustable flexure assembly further comprises a sliding actuator associated with each flexure clamp, wherein the sliding actuator is configured to contact the sliding portion of the flexure clamp to displace the sliding portion relative to the adjustable plate thereby flexing the flexible webbing and adjusting the position of the flexure coupled to the flexure clamp relative to the adjustable plate and the chuck.

11. The alignment apparatus of claim 10, further comprising a plurality of stops coupled to the adjustable plate proximate the sliding portion of the flexure clamp, wherein each stop limits the sliding of the sliding portion of the flexure clamp.

12. The alignment apparatus of claim 1, further comprising a centration measurement apparatus configured to measure an optical axis alignment of one or more components of the optical assembly.

13. The optical assembly of claim 1, wherein a force/displacement ratio applied by the plurality of flexures to the optical component is about $1.0 \times 10^{-6}$ N/mm to about $2 \times 10^{-6}$ N/mm.

14. The optical assembly of claim 1, wherein each flexure of the plurality of flexures comprises a length to diameter ratio of about 80:1 to about 160:1.

15. The alignment apparatus of claim 1, wherein, from the contact of the flexure with the optical assembly, the flexure is configured to bend less than about 10 mm relative to an initial position of the flexure.

16. A method for aligning components of an optical assembly, the method comprising:
    placing a first lens comprising a first lens optical axis on a chuck of an alignment apparatus for aligning components of the optical assembly;

applying a liquid to a coupling surface of the first lens;

placing a second lens comprising a second lens optical axis on the coupling surface of the first lens such that the liquid is disposed between the first lens and the second lens;

contacting an edge of the second lens with a plurality of flexures, each of the plurality of flexures being configured to deflect in response to the contact with the second lens; and adjusting a position of one or more flexures of the plurality of flexures in contact with the second lens thereby aligning the second lens optical axis of the second lens with the first lens optical axis of the first lens.

17. The method of claim 16, further comprising rotating the alignment apparatus about a datum axis.

18. The method of claim 16, further comprising:
measuring an optical axis alignment of the first lens and the second lens with a centration measurement apparatus; and
evaporating the liquid when the optical axis alignment of the first lens and the second lens is within a predetermined alignment range.

19. The method of claim 16, wherein the first lens comprises a convex coupling surface and the second lens comprises a concave coupling surface, wherein the concave coupling surface of the second lens is contacted to the convex coupling surface of the first lens with the liquid.

20. The method of claim 16, wherein aligning the second lens optical axis of the second lens with the first lens optical axis of the first lens such that an angle of deviation between the first lens optical axis and the second lens optical axis is less than about 1,000 μrad.

* * * * *